US012645438B2

(12) United States Patent     (10) Patent No.:   US 12,645,438 B2

Xiao et al.             (45) Date of Patent:      Jun. 2, 2026

(54) CONCEPT FOR HANDLING MEMORY SPILLS

(71) Applicant: Intel Corporation, Santa Clara, CA (US)

(72) Inventors: Wei Xiao, Shanghai (CN); Xinmin Tian, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/161,105

(22) Filed: Jan. 30, 2023

(65) Prior Publication Data

US 2023/0244456 A1     Aug. 3, 2023

(30) Foreign Application Priority Data

Jan. 28, 2022    (WO) ................ PCT/CN2022/074830

(51) Int. Cl.
     *G06F 8/41*          (2018.01)
     *G06F 9/30*          (2018.01)

(52) U.S. Cl.
     CPC .......... *G06F 8/441* (2013.01); *G06F 9/30112* (2013.01)

(58) Field of Classification Search
     CPC ............................ G06F 8/441; G06F 9/30112
     USPC ................................................ 717/151–161
     See application file for complete search history.

(56) References Cited

U.S. PATENT DOCUMENTS

| | | | |
|---|---|---|---|
| 6,408,433 B1 | 6/2002 | Click, Jr. et al. | |
| 9,552,206 B2 * | 1/2017 | Johnson .............. | G06F 9/38875 |
| 11,397,580 B2 * | 7/2022 | Eltantawy ............... | G06F 8/445 |
| 11,630,654 B2 * | 4/2023 | Tsang .................... | G06F 8/4442 |
| | | | 717/161 |
| 2003/0237080 A1 * | 12/2003 | Thompson .............. | G06F 8/441 |
| | | | 712/241 |
| 2007/0038984 A1 | 2/2007 | Gschwind et al. | |
| 2007/0124722 A1 | 5/2007 | Gschwind | |
| 2011/0047533 A1 | 2/2011 | Gschwind | |

FOREIGN PATENT DOCUMENTS

CN        101694627 A      4/2010

OTHER PUBLICATIONS

Holler, "Optimization for a Superscalar Out-of-Order Machine", 1996, IEEE, pp. 336-348. (Year: 1996).*

Espasa et al., "A victim cache for vector registers", 1997, ACM, pp. 293-300. (Year: 1997).*

* cited by examiner

*Primary Examiner* — Ted T. Vo

(74) *Attorney, Agent, or Firm* — SPL Patent Attorneys PartG mbB; Yong Beom Hwang

(57)            ABSTRACT

Examples provide an apparatus, device, method, computer program and non-transitory machine-readable storage medium including program code for processing memory spill code during compilation of a computer program. The non-transitory machine-readable storage medium includes program code for processing memory spill code during compilation of a computer program, when executed, to cause a machine to perform identifying a plurality of instructions related to scalar memory spill code during compilation of a computer program, and transforming at least a subset of the plurality of instructions into vectorized code.

17 Claims, 9 Drawing Sheets

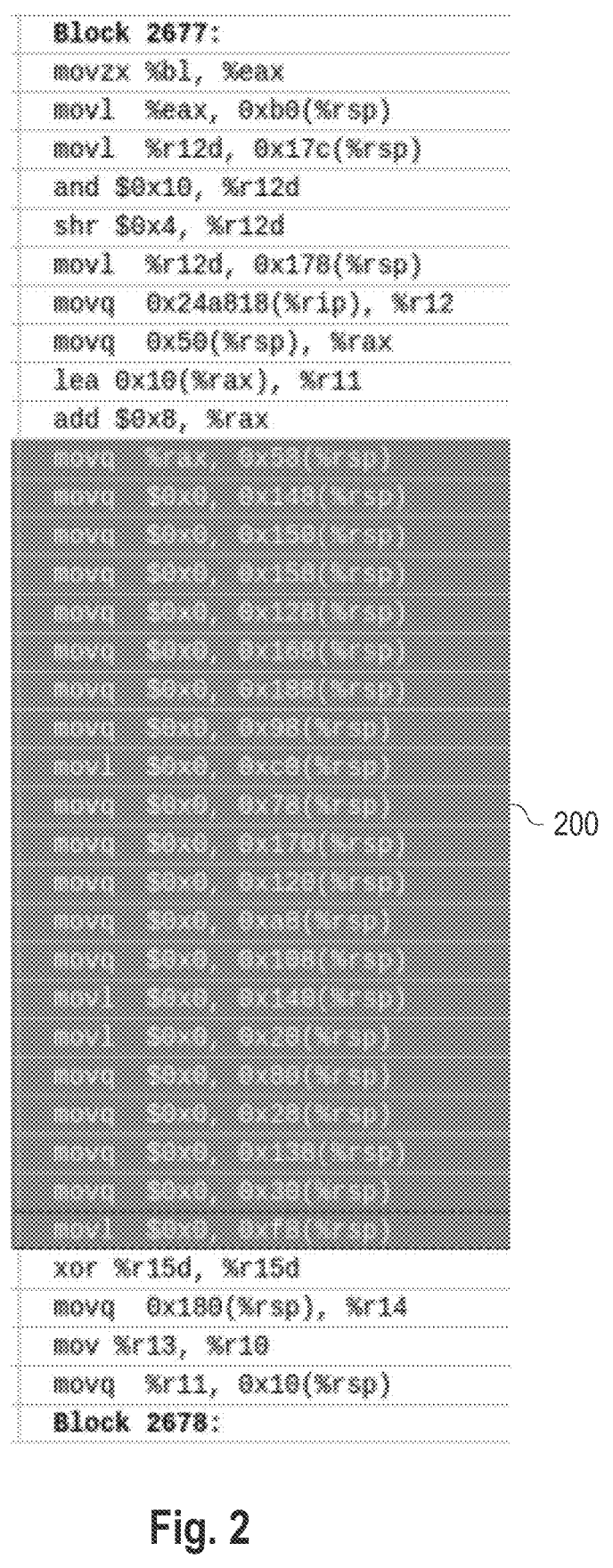

```
Block 2677:
movzx %bl, %eax
movl  %eax, 0xb0(%rsp)
movl  %r12d, 0x17c(%rsp)
and $0x10, %r12d
shr $0x4, %r12d
movl  %r12d, 0x178(%rsp)
movq  0x24a818(%rip), %r12
movq  0x50(%rsp), %rax
lea 0x10(%rax), %r11
add $0x8, %rax
```

~ 200

```
xor %r15d, %r15d
movq  0x180(%rsp), %r14
mov %r13, %r10
movq  %r11, 0x10(%rsp)
Block 2678:
```

Fig. 2

Block 2675:

```
movzx %bl, %eax
movl  %eax, 0x88(%rsp)
movl  %r12d, 0x110(%rsp)
and $0x10, %r12d
shr $0x4, %r12d
movl  %r12d, 0x108(%rsp)
movq  0x24a6ca(%rip), %r12
movq  0x40(%rsp), %rax
```

Fig. 3

| Benchmark | Gain (%) |
|---|---|
| 500.perlbench_r | 2.20 |
| 521.wrf_r | 4.89 |
| 525.x264_r | 1.40 |
| 526.blender_r | 1.96 |
| 538.imagick_r | 2.57 |
| 549.fotonik3d_r | 1.48 |

Fig. 4

```
/*
Input:
  int SpillNum: number of spill candidates
  int SpillSize[SpillNum]: size of according spill candidate Output:
  bool SpillSelect[SpillNum]: select according spill candidate
*/
  int TotalSize = 0;
  for (int i = 0; i < SpillNum; i++)
    TotalSize += SpillSize[i];
  /* Align to minimal vector register size: 16 */
  int AlignedTotalSize = alignDown(TotalSize, 16);
  int MaxSpillNum[SpillNum][AlignedTotalSize+1] = { -1 };
  bool SelectSpill[SpillNum][AlignedTotalSize+1] = { false };

/* Initialize the first column for size: 0 */
  for (int Row = 0; Row < SpillNum; ++Row)
    MaxSpillNum[Row][0] = 0; /* Don't select any spill */

/* Initialize the first row: only have the first spill */
  if (SpillSize[0] <= AlignedTotalSize) {
    MaxSpillNum[0][SpillSize[0]] = 1;
    SelectSpill[0][SpillSize[0]] = true;
  }
```

Fig. 6a

```
for (int Row = 1; Row < SpillNum; ++Row)
    for (int Col = 1; Col < AlignedTotalSize+1; ++Col) {
        /* Remaining size if select current (Row) spill */
        int SelectRemSize = Col - SpillSize[Row];
        int SelectSpillNum = -1;
        if (SelectRemSize >= 0 &&
            MaxSpillNum[Row-1][SelectRemSize] != -1) {
            /* There is solution if select current (Row) spill */
            SelectSpillNum = MaxSpillNum[Row-1][SelectRemSize] + 1;
        }
        /* If not select current (Row) spill */
        int UnSelectSpillNum = MaxSpillNum[Row - 1][Col];
        if (SelectSpillNum > UnSelectSpillNum) {
            /* Select current (Row) spill for size: Col */
            MaxSpillNum[Row][Col] = SelectSpillNum;
            SelectSpill[Row][Col] = true;
        } else {
            /* Not select current (Row) spill for size: Col */
            MaxSpillNum[Row][Col] = UnSelectSpillNum;
            SelectSpill[Row][Col] = false;
        }
    }
```

Fig. 6b

```
/* Record the result of selecting maximum spills */
int SelectSpillNum =
      MaxSpillNum[SpillNum-1][AlignedTotalSize];
int Row = SpillNum - 1;
int Col = AlignedTotalSize;
while (SelectSpillNum) {
    if (SelectSpill[Row][Col]) {
        SpillSelect[Row] = true;
        Col -= SpillSize[Row];
        Row--;
        SelectSpillNum--;
    } else {
        SpillSelect[Row] = false;
        Row--;
    }
}
```

Fig. 6c

BB_n:
...
MOV64mi32 %stack.3, 1, $noreg, 0, $noreg, 0 :: (store (s64) into %stack.3)
MOV64mi32 %stack.2, 1, $noreg, 0, $noreg, 0 :: (store (s64) into %stack.2)
MOV32mi %stack.1, 1, $noreg, 0, $noreg, 0 :: (store (s32) into %stack.1)
MOV64mi32 %stack.5, 1, $noreg, 0, $noreg, 0 :: (store (s64) into %stack.5)
MOV32mi %stack.4, 1, $noreg, 0, $noreg, 0 :: (store (s32) into %stack.4)
MOV64mi32 %stack.6, 1, $noreg, 0, $noreg, 0 :: (store (s64) into %stack.6)
MOV64mi32 %stack.7, 1, $noreg, 0, $noreg, 0 :: (store (s64) into %stack.7)
MOV32mi %stack.0, 1, $noreg, 0, $noreg, 0 :: (store (s32) into %stack.0)
...

Improved spill code low-level Vec plan for BB_n:

0 Slot: 3    Size: 8  {vec}
1 Slot: 2    Size: 8  {vec}
2 Slot: 1    Size: 4  {vec}
3 Slot: 5    Size: 8  {vec}
4 Slot: 4    Size: 4  {vec}
5 Slot: 6    Size: 8  {vec}
6 Slot: 7    Size: 8  {vec}
7 Slot: 0    Size: 4

Vec plan reduce spill#: 8 - 4 = 4

Fig. 7

| | Scalar spill code (without the proposed concept) |
|---|---|
| 1) | movq  $0, 40(%rsp) |
| 2) | movq  $0, 48(%rsp) |
| 3) | movl  $0, 8(%rsp) |
| 4) | movq  $0, 32(%rsp) |
| 5) | movl  $0, 4(%rsp) |
| 6) | movq  $0, 24(%rsp) |
| 7) | movq  $0, 16(%rsp) |
| 8) | movl  $0, 12(%rsp) |

| | Vector spill code (with the proposed concept) |
|---|---|
| 1) | vpxorq %xmm16, %xmm16, %xmm16 |
| 2) | vmovdqu64   %ymm16, 16(%rsp) |
| 3) | vmovdqa64   %xmm16, 48(%rsp) |
| 4) | movl   $0, 12(%rsp) |

Fig. 9

CONCEPT FOR HANDLING MEMORY SPILLS

FIELD

Examples relate to a concept for handling memory spill code in a compiler. Examples provide an apparatus, device, method, computer program and non-transitory machine-readable storage medium including program code for processing memory spill code during compilation of a computer program.

BACKGROUND

When a compiler generates machine code, if there are more live variables than machine physical registers, the compiler may save/restore some of these variables through memory instead of using registers. This indicates that the compiler inserts so-called spill code (i.e., load and store instructions) to commute values between registers and memory.

BRIEF DESCRIPTION OF THE FIGURES

Some examples of apparatuses and/or methods will be described in the following by way of example only, and with reference to the accompanying figures, in which

FIG. 2 shows assembly code of an example taken from a benchmark;

FIG. 3 shows a code snippet with an improved or optimized set of instructions;

FIG. 4 shows a table highlighting the performance impact of the proposed concept in some benchmarks;

FIGS. 6a to 6c show source code of an example of an algorithm for selecting the scalar spill code;

FIG. 7 shows an example of assembly code of a basic block and of stack slots being used for said basic block;

FIG. 9 shows a table of an example of determined spill instructions.

DETAILED DESCRIPTION

Figure 1A:
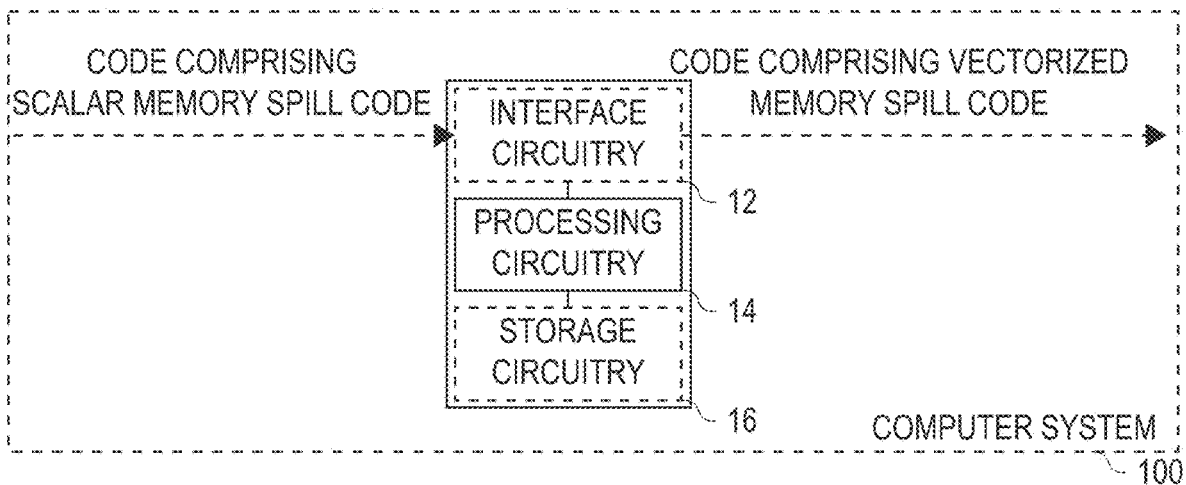
FIG. 1a shows a block diagram of an example of an apparatus or device for processing memory spill code during compilation of a computer program.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Various examples relate to methods and apparatuses for bundling memory spills and generating SIMD (Single Instruction, Multiple Data) code for modern processors.

FIG. 1a shows a block diagram of an example of an apparatus 10 or device 10 for processing memory spill code during compilation of a computer program, and of a computer system 100 comprising such an apparatus 10 or device 10. The apparatus 10 comprises circuitry to provide the functionality of the apparatus 10. For example, the circuitry of the apparatus 10 may be configured to provide the functionality of the apparatus 10. For example, the apparatus 10 of FIG. 1a comprises (optional) interface circuitry 12, processing circuitry 14 and (optional) storage circuitry 16. For example, the processing circuitry 14 may be coupled with the interface circuitry 12 and with the storage circuitry 16. For example, the processing circuitry 14 may provide the functionality of the apparatus, in conjunction with the interface circuitry 12 (for exchanging information, e.g., with other components inside or outside the worker node 100 comprising the apparatus or device 10) and the storage circuitry 16 (for storing information, such as machine-readable instructions). Likewise, the device 10 may comprise means for providing the functionality of the device 10. For example, the means may be configured to provide the functionality of the device 10. The components of the device 10 are defined as component means, which may correspond to, or implemented by, the respective structural components of the apparatus 10. For example, the device 10 of FIGS. 1a and 1b comprises means for processing 14, which may correspond to or be implemented by the processing circuitry 14, means for communicating 12, which may correspond to or be implemented by the interface circuitry 12, and (optional) means for storing information 16, which may correspond to or be implemented by the storage circuitry 16. In general, the functionality of the processing circuitry 14 or means for processing 14 may be implemented by the processing circuitry 14 or means for processing 14 executing machine-readable instructions. Accordingly, any feature ascribed to the processing circuitry 14 or means for processing 14 may be defined by one or more instructions of a plurality of machine-readable instructions. The apparatus 10 or device 10 may comprise the machine-readable instructions, e.g., within the storage circuitry 16 or means for storing information 16.

The processing circuitry 14 or means for processing 14 is to identify a plurality of instructions related to scalar memory spill code during compilation of the computer program. The processing circuitry 14 or means for processing 14 is to transform at least a subset of the plurality of instructions into vectorized code.

Figure 1B:
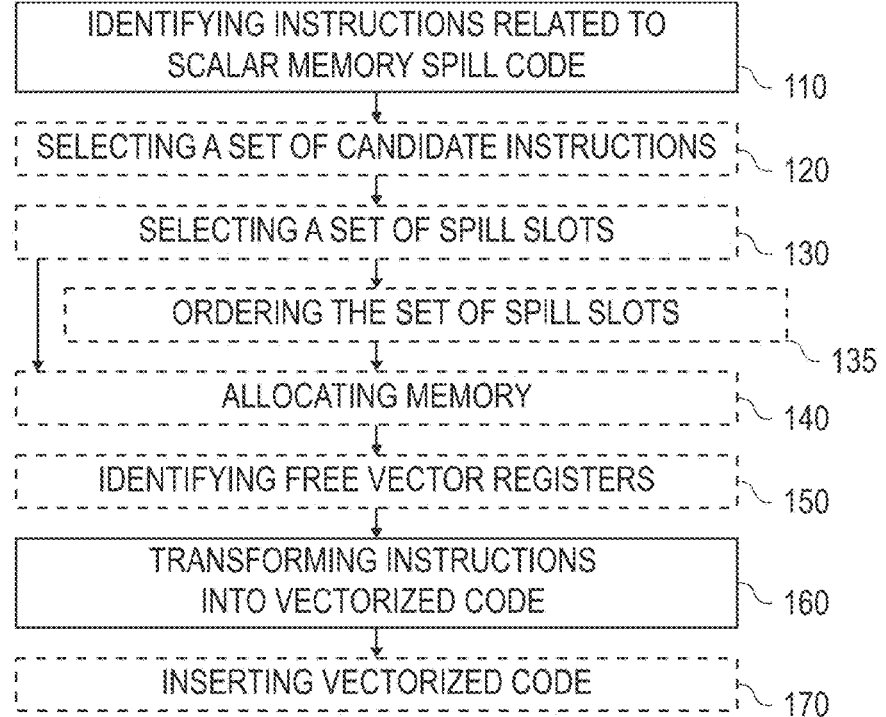
FIG. 1b shows a flow chart of an example of a method for processing memory spill code during compilation of a computer program.

FIG. 1b shows a flow chart of an example of a corresponding method for processing the memory spill code during compilation of the computer program. The method comprises identifying 110 a plurality of instructions related to scalar memory spill code during compilation of a computer program. The method comprises transforming 160 at least a subset of the plurality of instructions into vectorized code.

In the following, the details of the apparatus 10, device 10, method, and of a corresponding program code or computer program are discussed with respect to the method of FIG. 1b. Features introduced in connection with the method of FIG. 1b may likewise be applied to the corresponding apparatus 10, device 10 and program code or computer program. For example the processing circuitry 14 or means for processing 14 may execute the method of FIG. 1b. For example, the program code may be program code for performing the method of FIG. 1b when the program code is executed on a machine, computer, a processor, or a programmable hardware component.

The present disclosure relates to the vectorization of scalar memory spill code. Memory spill code widely exists in the machine code from CPU (Central Processing Unit)-intensive programs such as SPEC (Standard Performance Evaluation Cooperation) CPU2017 benchmarks (SPEC CPU2017 is an industry standard benchmark suite for CPU performance evaluation), and some of the memory spills even appear in performance-critical paths. FIG. 2 shows assembly code of an example from a benchmark, namely SPEC CPU2017/500.perlbench. FIG. 2 shows the assembly code of memory spill occurring in SPEC CPU2017/500.perlbench.

A lot of live variables (e.g., 'n', 'result' and 'depth' as shown above) are declared and initialized to zero at function entry. These variables are reassigned and used in following branchy code so re-materialization is impossible. Since the register pressure is huge between their definition and use, spill code (as highlighted in FIG. 2) is created by the compiler to initialize the variables. Most, if not all, mainstream compilers (such as GCC (GNU is not Unix Compiler Collection), LLVM (Low-Level Virtual Machine), ICC (Intel® C. Compiler) and ICX (a next-generation Intel® C. compiler) cannot further optimize these scalar spill code.

The proposed concept comprises one or more of the following four aspects:

1) A framework for enabling straight-line code vectorization in a low-level code generator with more precise memory spill information;

2) A process for identifying a set of instructions, which operate on arbitrary data type and size, as memory spill code candidates for low-level vectorization;

3) A process for bundling and allocating memory spill slots for vectorization; and 4) A process for generating improved vectorized memory spill code.

Accordingly, the method may comprise identifying a set of instructions as memory spill code candidates for low-level vectorization, bundling and allocating memory spill slots for vectorization, and generating vectorized memory spill code.

In summary, instructions related to scalar memory spill code (i.e., instructions implementing memory spills in a scalar manner) are identified 110. At least a subset of the instructions (in the following also denoted the "set of instructions" are selected, and transformed 160 from scalar code to vectorized code. In this context, memory spill code may refer to code for initializing variables on the stack (instead of the processor registers), and in particular in a spill slot on the stack. Scalar spill code may be code, in which a single variable is initialized on the stack per instruction. Vectorized spill code may be code, in which multiple variables are initialized in parallel per instruction. The initialized variable may be initialized in a so-called spill slot, which is a portion of memory on the stack.

For the above example, the original memory spill code has 21 instructions (shown highlighted 200 in FIG. 2) for those scalar initialization source code. By applying the proposed improvement/optimization technology, the compiler is able to reduce instruction count to 6 instructions as highlighted 300 on the code snippet shown in FIG. 3, which effectively improves the performance of this example by utilizing SIMD instructions. FIG. 3 shows a code snippet with an improved or optimized set of instructions. In the context of the present disclosure, the term "optimize", "optimized" or "optimization" does not necessarily imply that the result of the optimization is the optimal result. It merely indicates that the result of the optimization is improved over the initial version of the thing being optimized.

The proposed concepts and methods proposed in the present disclosure are generally applicable to (modern) CPUs from various vendors. The proposed concepts and methods may be considered to be valuable for improving the performance of CPUs that have a rich set of SIMD instructions for exploiting vector-level data-parallelism, while other available product and research compilers generally cannot perform spill code vectorization so far. For example, the proposed concept has been implemented in an Intel® product compiler (ICX). FIG. 4 shows a table highlighting the performance impact of the proposed concept in some benchmarks of the SPEC CPU 2017 compiler suite. Any compiler for modern processors may be extended to support the proposed concept.

The proposed concept may enable a compiler to improve/ optimize original straight-line scalar spill code to vectorized spill code with SIMD instructions. For example, the improved spill code can be observed in the assembly code generated by the respective compiler.

Figure 5:
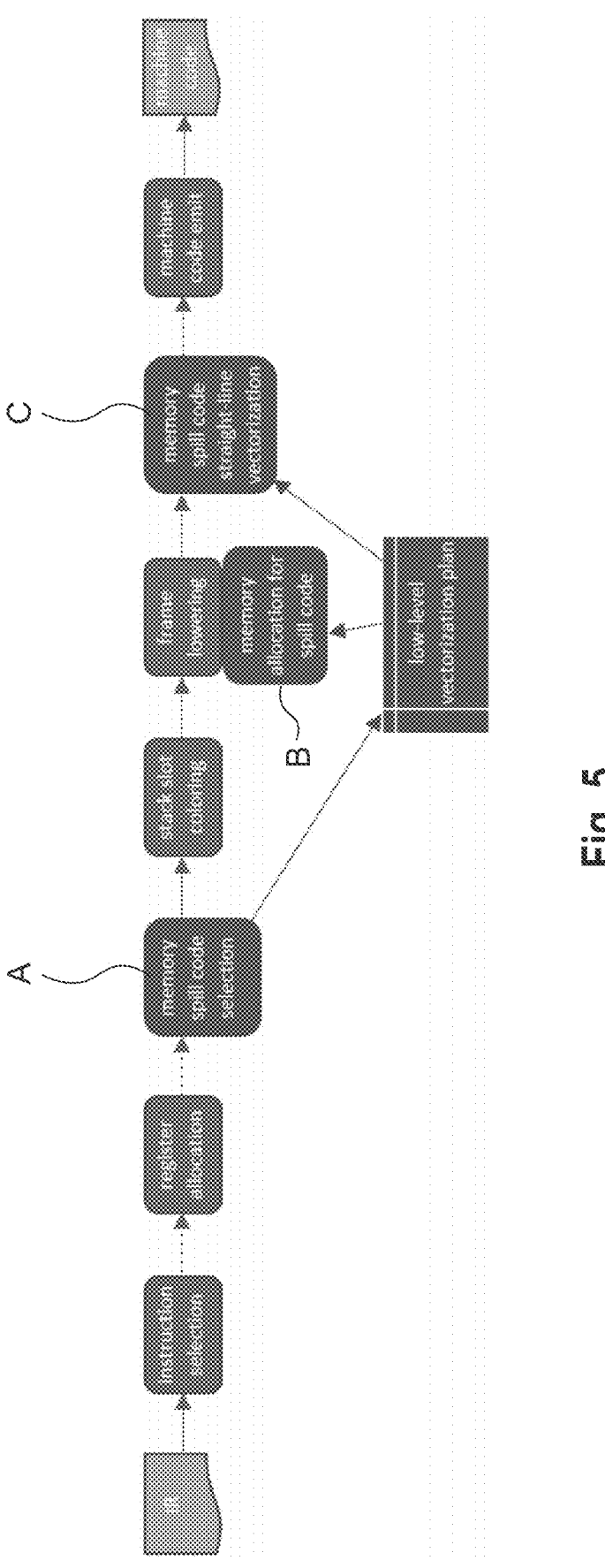
FIG. 5 shows a flow chart of an example of a main architecture of the proposed compiler framework.

FIG. 5 shows a flow chart of an example of a main architecture of the proposed compiler framework for vec- torizing spill code that is based on the proposed concept. Essentially, the proposed concept may enhance the compiler backend with 3 phases—Memory spill code selection (A), memory allocation for spill code (B) and memory spill code straight-line vectorization (C). The flow comprises the stages IR (Intermediate Representation)→instruction selec- tion→register allocation→memory spill code selection (A)→slack slot coloring→frame lowering→memory spill code straight-line vectorization (C)→machine code emit- →machine code, and memory spill code selection (A)→low-level vectorization plan, with low-level vectoriza- tion plan→memory allocation for split code (B) and low- level vectorization plan→memory spill code straight-line vectorization (C). Accordingly, the identification of the plurality of instructions and the transformation of at least the subset of the plurality of instructions may be performed during compilation of the computer program from an inter- mediate representation to machine code.

(A) Memory spill code selection executes after RA (reg- ister allocation) but before stack slot coloring (which allo- cates stack objects for spill slots). For example, the plurality of instructions may be identified, during compilation of the computer program, after register allocation and/or before allocation of stack objects for spill slots. In this context, stack slot coloring refers to a graph-based technique for allocating stack objects for spill slots. In stack slot coloring, graph theory is used to determine the number of stack slots required, and the allocation of spill slots to stack objects. In this technique, the lifetimes of the variables used in a basic block are represented by a graph. Within the graph, the lifetimes of the variable are represented as vertices. Over- lapping lifetimes (i.e., variables that are, at least potentially, used at the same time) are connected via edges that are called "interference arcs". In stack slot coloring, the graph may be colored such, that no two vertices connected by an interference arc have the same color. In the graph, the colors represent the stack slots, with the stack slot coloring being used to ensure that the stack slots are only used by one variable during the lifetime of the variable.

In various examples of the present disclosure, the spill code vectorization may be performed on a per-basic block granularity level. For example, the plurality of instructions are identified within a basic block of an intermediate rep- resentation of the computer program. The proposed concept may perform on each BB (basic block) to collect a candidate set from all scalar spill instructions of current BB which satisfy one or more of (1) Each spill instruction performs vectorizable operations such as reset spill slot (as in the above example) or isomorphic opcode after/before spill slot load/store and (2) Each spill slot is not already selected as candidate and only manipulated once at current BB. In other words, as further shown in FIG. 1*b*, the method may comprise selecting 120 a set of candidate instructions of the plurality of instructions according to one or more selection criteria and transforming 160 the set of candidate instruc- tions. For example, as expressed in (1), an instruction may be selected as candidate if the instruction performs a vec- torizable operation. Moreover, as expressed in (2), the set of candidate instructions may be selected such, that each spill slot is manipulated at most once within a basic block comprising the plurality of instructions. The selected can- didates may then be assigned to corresponding spill slots. In other words, the method may comprise selecting 130 a set of spill slots based on the selected set of candidate instructions. For example, one spill slot may be selected for each instruc- tion of the set of candidate instructions. In addition, memory may be allocated for the spill slots. In other words, the method may comprise allocating 140 memory for the set of spill slots.

With the spill candidate set, the following algorithm may be used to select some (or all) of the scalar spill code to create an improved or optimized low-level vectorization plan which reduces the maximal scalar spill code. FIGS. 6*a* to 6*c* show source code of an example of an algorithm for selecting the scalar spill code.

For the following example BB_n (as shown on the left in FIG. 7), which has 8 spill instructions, the algorithm selects 7 spills (with various sizes), which operate on stack slots 1-7 (as shown on the right in FIG. 7) to compose a combined spill area whose size is 48 bytes for spill vectorization.

It may also try to find free vector registers (such as YMM16) at the current BB for later generating spill code vectorization. In other words, as shown in FIG. 1*b*, the method may comprise identifying 150 free vector registers for the set of candidate instructions, with the set of instruc- tions being transformed into vectorized instructions using the identified vector registers. For the Intel® AVX512 vector extensions, the algorithm may prefer YMA/116-YMM31 to avoid generating extra vzeroupper instructions. These found vector registers should be free (not used by others) at the place where all operands (of scalar spill code) are ready. If operands are constant (as in the above example) then the vector register should be free at the BB entry. If the algorithm fails to find such free vector registers, it may stop vectorizing the spill code. The algorithm may allocate the selected spill slots to different allocate space so that they do not share stack objects with other unselected spill slots (which may be bigger than them) by following the stack coloring. In other words, the memory for the set of spill slots may be allocated in a first memory region that is separate from a second memory region being allocated for spill slots outside the set of spill slots (i.e., the unselected spill slots). For example, the spill slots may be selected and/or a memory may be allocated for the spill slots based on the graph coloring being used for memory allocation of the stack.

(B) Memory allocation for Spill Code may execute during frame lowering, which allocates stack space for each stack object. It may allocate contiguous stack space for the selected spill slots of each BB, e.g., using the following two tasks (1) For each BB low-level spill code vectorization plan, the algorithm may re-order selected spill slots by size from the biggest to the smallest so that there might not be any holes caused by alignment between selected slots. In other words, as further shown in FIG. 1*b*, the method may comprise ordering 135 the spill slots of the set of spill slots according to size. (2) The algorithm may allocate contiguous stack space for the re-ordered slots, e.g., at the very begin- ning of local slot stack space allocation. In other words, at least the first memory region (comprising the spill slots for the set of candidate instructions) may be a contiguous memory region. The first memory region may be allocated closer to a beginning of a local slot stack space allocation than the second memory region (for the unselected stack slots). The algorithm may place the stack space of the remaining unselected slots after vectorized spilling slots space so that alignment is satisfied.

Figure 8:
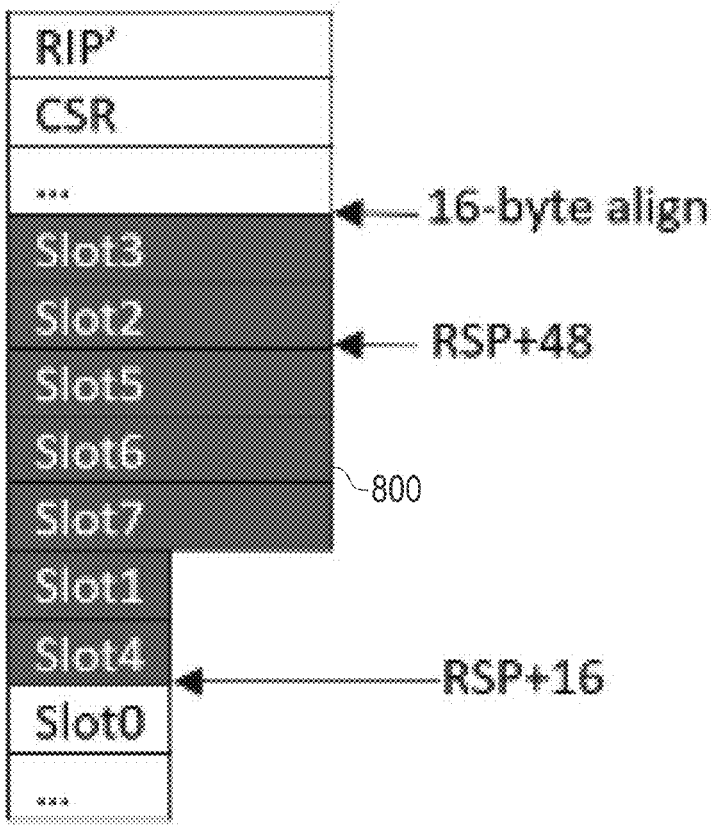
FIG. 8 shows an example of a stack space layout.

FIG. 8 shows an example of a stack space layout for the above example, where the vectorized spill slots are allocated to stack space in the highlighted cells 800.

(C) Memory Spill code straight-line vectorization executes after frame lowering when stack space is allocated to replace the original scalar spill code (which operates on scattered stack space) with the corresponding vectorized spill code (which operates on contiguously allocated stack space) with the vector registers identified in (A). In effect, the scalar memory spill code of the set of instructions operating on scattered stack space may be transformed 160 into corresponding vectorized spill code operating on contiguously allocated stack space.

The vectorized code may be inserted at the place immediately after all operands (of original scalar spill code) are ready. If the operands are constant (as in the above example) then the vectorization code may be inserted at the BB entry. If the BB entry setups stack frame (e.g., entry BB of function), then the vectorized code may be put after the frame setup code (i.e., stack top pointer (RSP) is changed). In summary, as shown in FIG. 1b, the vectorized code may be inserted 170 into the compiled code after the operands of the scalar memory spill code are ready, or at an entry of a basic block comprising the plurality of instructions in case the operands are constant, or after a frame setup code at the entry of the basic block.

FIG. 9 shows a table of an example of the determined spill instructions for the above example (with the scalar spill code on the left, and the improved vector spill code on the right).

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 100 may be any computer system that is suitable for compiling code, such as a desktop computer system, a laptop computer system, a workstation computer system or a server computer system.

In the following, some examples of the proposed concept are presented:

An example (e.g., example 1) relates to a non-transitory machine-readable storage medium comprising a program code for processing memory spill code during compilation of a computer program that, when executed, causes a machine to perform identifying a plurality of instructions related to scalar memory spill code during compilation of a computer program. The program code is to cause a machine to perform transforming at least a subset of the plurality of instructions into vectorized code.

Another example (e.g., example 2) relates to a previously described example (e.g., example 1) or to any of the examples described herein, further comprising that the plurality of instructions are identified within a basic block of an intermediate representation of the computer program.

Another example (e.g., example 3) relates to a previously described example (e.g., one of the examples 1 to 2) or to any of the examples described herein, further comprising that the program code is to cause a machine to perform selecting a set of candidate instructions of the plurality of instructions according to one or more selection criteria, and transforming the set of candidate instructions.

Another example (e.g., example 4) relates to a previously described example (e.g., example 3) or to any of the examples described herein, further comprising that an instruction is selected as candidate if the instruction performs a vectorizable operation.

Another example (e.g., example 5) relates to a previously described example (e.g., one of the examples 3 to 4) or to any of the examples described herein, further comprising that the set of candidate instructions are selected such, that each spill slot is manipulated at most once within a basic block comprising the plurality of instructions.

Another example (e.g., example 6) relates to a previously described example (e.g., one of the examples 3 to 5) or to any of the examples described herein, further comprising that the program code is to cause a machine to perform selecting a set of spill slots based on the selected set of candidate instructions.

Another example (e.g., example 7) relates to a previously described example (e.g., example 6) or to any of the examples described herein, further comprising that the program code is to cause a machine to perform allocating memory for the set of spill slots, with the memory being allocated in a first memory region that is separate from a second memory region being allocated for spill slots outside the set of spill slots.

Another example (e.g., example 8) relates to a previously described example (e.g., example 7) or to any of the examples described herein, further comprising that the first memory region is allocated closer to a beginning of a local slot stack space allocation than the second memory region.

Another example (e.g., example 9) relates to a previously described example (e.g., one of the examples 7 to 8) or to any of the examples described herein, further comprising that at least the first memory region is a contiguous memory region.

Another example (e.g., example 10) relates to a previously described example (e.g., one of the examples 6 to 9) or to any of the examples described herein, further comprising that the spill slots are selected and/or a memory is allocated for the spill slots based on a graph coloring being used for memory allocation of the stack.

Another example (e.g., example 11) relates to a previously described example (e.g., one of the examples 6 to 10) or to any of the examples described herein, further comprising that the program code is to cause a machine to perform ordering the spill slots of the set of spill slots according to size.

Another example (e.g., example 12) relates to a previously described example (e.g., one of the examples 3 to 11) or to any of the examples described herein, further comprising that the program code is to cause a machine to perform identifying free vector registers for the set of candidate instructions, the set of instructions being transformed into vectorized instructions using the identified vector registers.

Another example (e.g., example 13) relates to a previously described example (e.g., one of the examples 3 to 12) or to any of the examples described herein, further comprising that the scalar memory spill code of the set of instructions operating on scattered stack space is transformed into corresponding vectorized spill code operating on contiguously allocated stack space.

Another example (e.g., example 14) relates to a previously described example (e.g., one of the examples 1 to 13) or to any of the examples described herein, further comprising that the vectorized code is inserted into the compiled code after the operands of the scalar memory spill code are ready, or at an entry of a basic block comprising the plurality of instructions in case the operands are constant, or after a frame setup code at the entry of the basic block.

Another example (e.g., example 15) relates to a previously described example (e.g., one of the examples 1 to 14) or to any of the examples described herein, further comprising that the plurality of instructions are identified, during compilation of the computer program, after register allocation.

Another example (e.g., example 16) relates to a previously described example (e.g., one of the examples 1 to 15) or to any of the examples described herein, further comprising that the plurality of instructions are identified, during compilation of the computer program, before allocation of stack objects for spill slots.

Another example (e.g., example 17) relates to a previously described example (e.g., one of the examples 1 to 16) or to any of the examples described herein, further comprising that the identification of the plurality of instructions and the transformation of at least the subset of the plurality of instructions is performed during compilation of the computer program from an intermediate representation to machine code.

Another example (e.g., example 18) relates to a previously described example (e.g., one of the examples 1 to 17) or to any of the examples described herein, further comprising that the program code is to cause a machine to perform identifying a set of instructions as memory spill code candidates for low-level vectorization, bundling and allocating memory spill slots for vectorization, and generating vectorized memory spill code.

An example (e.g., example 19) relates to a method for processing memory spill code during compilation of a computer program. The method comprises identifying (110) a plurality of instructions related to scalar memory spill code during compilation of a computer program.

The method comprises transforming (160) at least a subset of the plurality of instructions into vectorized code.

Another example (e.g., example 20) relates to a previously described example (e.g., example 19) or to any of the examples described herein, further comprising that the plurality of instructions are identified within a basic block of an intermediate representation of the computer program.

Another example (e.g., example 21) relates to a previously described example (e.g., one of the examples 19 to 20) or to any of the examples described herein, further comprising that the method comprises selecting (120) a set of candidate instructions of the plurality of instructions according to one or more selection criteria, and transforming (160) the set of candidate instructions.

Another example (e.g., example 22) relates to a previously described example (e.g., example 21) or to any of the examples described herein, further comprising that an instruction is selected as candidate if the instruction performs a vectorizable operation.

Another example (e.g., example 23) relates to a previously described example (e.g., one of the examples 21 to 22) or to any of the examples described herein, further comprising that the set of candidate instructions are selected such, that each spill slot is manipulated at most once within a basic block comprising the plurality of instructions.

Another example (e.g., example 24) relates to a previously described example (e.g., one of the examples 21 to 23) or to any of the examples described herein, further comprising that the method comprises selecting (130) a set of spill slots based on the selected set of candidate instructions.

Another example (e.g., example 25) relates to a previously described example (e.g., example 24) or to any of the examples described herein, further comprising that the method comprises allocating (140) memory for the set of spill slots, with the memory being allocated in a first memory region that is separate from a second memory region being allocated for spill slots outside the set of spill slots.

Another example (e.g., example 26) relates to a previously described example (e.g., example 25) or to any of the examples described herein, further comprising that the first memory region is allocated closer to a beginning of a local slot stack space allocation than the second memory region.

Another example (e.g., example 27) relates to a previously described example (e.g., one of the examples 25 to 26) or to any of the examples described herein, further comprising that at least the first memory region is a contiguous memory region.

Another example (e.g., example 28) relates to a previously described example (e.g., one of the examples 24 to 27) or to any of the examples described herein, further comprising that the spill slots are selected and/or a memory is allocated for the spill slots based on a graph coloring being used for memory allocation of the stack.

Another example (e.g., example 29) relates to a previously described example (e.g., one of the examples 24 to 28) or to any of the examples described herein, further comprising that the method comprises ordering (135) the spill slots of the set of spill slots according to size.

Another example (e.g., example 30) relates to a previously described example (e.g., one of the examples 21 to 29) or to any of the examples described herein, further comprising that the method comprises identifying (150) free vector registers for the set of candidate instructions, the set of instructions being transformed into vectorized instructions using the identified vector registers.

Another example (e.g., example 31) relates to a previously described example (e.g., one of the examples 21 to 30) or to any of the examples described herein, further comprising that the scalar memory spill code of the set of instructions operating on scattered stack space is transformed (160)

into corresponding vectorized spill code operating on contiguously allocated stack space.

Another example (e.g., example 32) relates to a previously described example (e.g., one of the examples 19 to 31) or to any of the examples described herein, further comprising that the vectorized code is inserted (170) into the compiled code after the operands of the scalar memory spill code are ready, or at an entry of a basic block comprising the plurality of instructions in case the operands are constant, or after a frame setup code at the entry of the basic block.

Another example (e.g., example 33) relates to a previously described example (e.g., one of the examples 19 to 32) or to any of the examples described herein, further comprising that the plurality of instructions are identified, during compilation of the computer program, after register allocation.

Another example (e.g., example 34) relates to a previously described example (e.g., one of the examples 19 to 33) or to any of the examples described herein, further comprising that the plurality of instructions are identified, during compilation of the computer program, before allocation of stack objects for spill slots.

Another example (e.g., example 35) relates to a previously described example (e.g., one of the examples 19 to 34) or to any of the examples described herein, further comprising that the identification of the plurality of instructions and the transformation of at least the subset of the plurality of instructions is performed during compilation of the computer program from an intermediate representation to machine code.

Another example (e.g., example 36) relates to a previously described example (e.g., one of the examples 19 to 35) or to any of the examples described herein, further comprising that the method comprises identifying a set of instructions as memory spill code candidates for low-level vectorization. The method comprises bundling and allocating memory spill slots for vectorization. The method comprises generating vectorized memory spill code.

An example (e.g., example 37) relates to an apparatus (10) comprising machine-readable instructions and processing circuitry (14) to execute the machine-readable instructions to perform the method of one of the examples 19 to 36 or according to any other example.

An example (e.g., example 38) relates to a device (10) comprising means for processing (14) for performing the method of one of the examples 19 to 36 or according to any other example.

An example (e.g., example 39) relates to a computer program having a program code for performing the method of one of the examples 19 to 36 or according to any other example when the computer program is executed on a computer, a processor, or a programmable hardware component.

An example (e.g., example 40) relates to a method, apparatus, device, or computer program according to any one of the examples described herein.

An example (e.g., example A1) relates to a method for processing memory spill code during compilation of a computer program. The method comprises identifying a plurality of instructions related to scalar memory spill code during compilation of the computer program. The method comprises transforming at least a subset of the plurality of instructions into vectorized code.

Another example (e.g., example A2) relates to a previous example (e.g., example A1) or to any other example, further comprising that the method comprises identifying a set of instructions as memory spill code candidates for low-level vectorization, bundling and allocating memory spill slots for vectorization, and generating vectorized memory spill code.

An example (e.g., example A3) relates to an apparatus comprising processing circuitry configured to perform the method of one of the previous examples, e.g., of one of the examples A1 or A2, or of any other example.

An example (e.g., example A4) relates to a device comprising means for processing configured to perform the method of one of the previous examples, e.g., of one of the examples A1 or A2, or of any other example.

An example (e.g., example A5) relates to a non-transitory machine-readable storage medium including program code, when executed, to cause a machine to perform the method of a previous examples, e.g., one of the examples A1 or A2, or of any other example.

An example (e.g., example A6) relates to a computer program having a program code for performing the method of a previous examples, e.g., one of the examples A1 or A2, or of any other example when the computer program is executed on a computer, a processor, or a programmable hardware component.

An example (e.g., example A7) relates to a method, apparatus, device, or computer program according to any one of the examples described herein.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C #, Java, Perl, Python, JavaScript, Adobe Flash, C #, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A non-transitory machine-readable storage medium comprising a program code for processing memory spill code during compilation of a computer program that, when executed, causes a machine to perform:

identifying a plurality of instructions related to scalar memory spill code during compilation of a computer program; and transforming at least a subset of the plurality of instructions into vectorized code, wherein the program code is to cause a machine to perform selecting a set of candidate instructions of the plurality of instructions according to one or more selection criteria, and transforming the set of candidate instructions, wherein the program code is to cause a machine to perform selecting a set of spill slots based on the selected set of candidate instructions, wherein the program code is to cause a machine to perform allocating memory for the set of spill slots, with the memory being allocated in a first memory region that is separate from a second memory region being allocated for spill slots outside the set of spill slots.

2. The non-transitory machine-readable storage according to claim 1, wherein the plurality of instructions are identified within a basic block of an intermediate representation of the computer program.

3. The non-transitory machine-readable storage according to claim 1, wherein an instruction is selected as candidate if the instruction performs a vectorizable operation.

4. The non-transitory machine-readable storage according to claim 1, wherein the set of candidate instructions are selected such, that each spill slot is manipulated at most once within a basic block comprising the plurality of instructions.

5. The non-transitory machine-readable storage according to claim 1, wherein the first memory region is allocated closer to a beginning of a local slot stack space allocation than the second memory region.

6. The non-transitory machine-readable storage according to claim 1, wherein at least the first memory region is a contiguous memory region.

7. The non-transitory machine-readable storage according to claim 1, wherein the spill slots are selected and/or a memory is allocated for the spill slots based on a graph coloring being used for memory allocation of the stack.

8. The non-transitory machine-readable storage according to claim 1, wherein the program code is to cause a machine to perform ordering the spill slots of the set of spill slots according to size.

9. The non-transitory machine-readable storage according to claim 1, wherein the program code is to cause a machine to perform identifying free vector registers for the set of candidate instructions, the set of instructions being transformed into vectorized instructions using the identified vector registers.

10. The non-transitory machine-readable storage according to claim 1, wherein the scalar memory spill code of the set of instructions operating on scattered stack space is transformed into corresponding vectorized spill code operating on contiguously allocated stack space.

11. The non-transitory machine-readable storage according to claim 1, wherein the vectorized code is inserted into the compiled code after the operands of the scalar memory spill code are ready, or at an entry of a basic block comprising the plurality of instructions in case the operands are constant, or after a frame setup code at the entry of the basic block.

12. The non-transitory machine-readable storage according to claim 1, wherein the plurality of instructions are identified, during compilation of the computer program, after register allocation.

13. The non-transitory machine-readable storage according to claim 1, wherein the plurality of instructions are identified, during compilation of the computer program, before allocation of stack objects for spill slots.

14. The non-transitory machine-readable storage according to claim 1, wherein the identification of the plurality of instructions and the transformation of at least the subset of the plurality of instructions is performed during compilation of the computer program from an intermediate representation to machine code.

15. The non-transitory machine-readable storage according to claim 1, wherein the program code is to cause a machine to perform:

identifying a set of instructions as memory spill code candidates for low-level vectorization;

bundling and allocating memory spill slots for vectorization; and generating vectorized memory spill code.

16. A method for processing memory spill code during compilation of a computer program, the method comprising:

identifying a plurality of instructions related to scalar memory spill code during compilation of a computer program;

transforming at least a subset of the plurality of instructions into vectorized code;

selecting a set of candidate instructions of the plurality of instructions according to one or more selection criteria, and transforming the set of candidate instructions;

selecting a set of spill slots based on the selected set of candidate instructions; and allocating memory for the set of spill slots, with the memory being allocated in a first memory region that is separate from a second memory region being allocated for spill slots outside the set of spill slots.

17. An apparatus comprising interface circuitry, machine-readable instructions and processing circuitry to execute the machine-readable instructions to perform the method of claim 16.

* * * * *